May 23, 1939. R. K. LEE 2,159,332
MOTOR VEHICLE
Filed Dec. 4, 1936 5 Sheets-Sheet 1
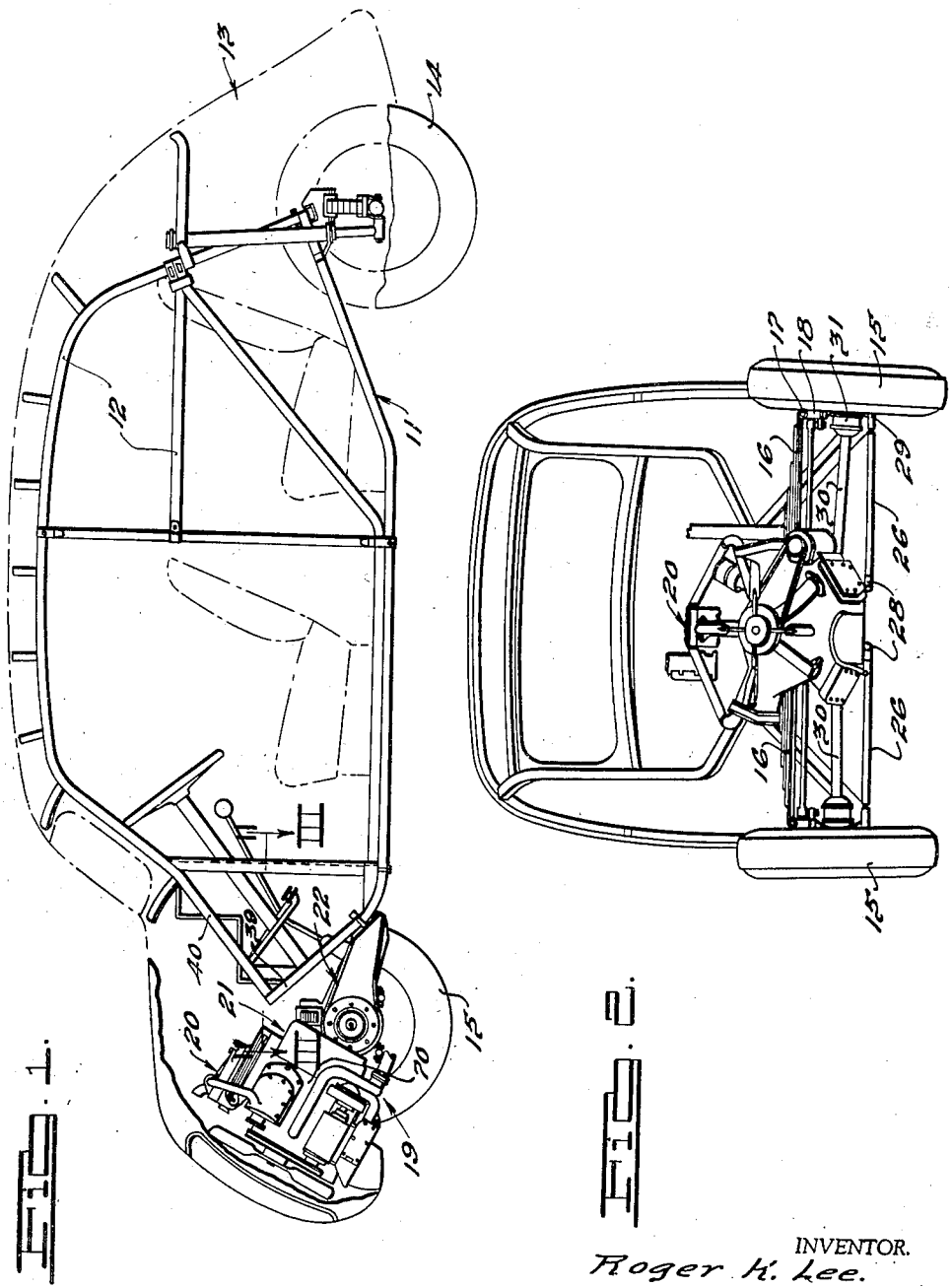
INVENTOR.
Roger K. Lee.
BY Harness, Lind, Pates & Harris
ATTORNEYS.

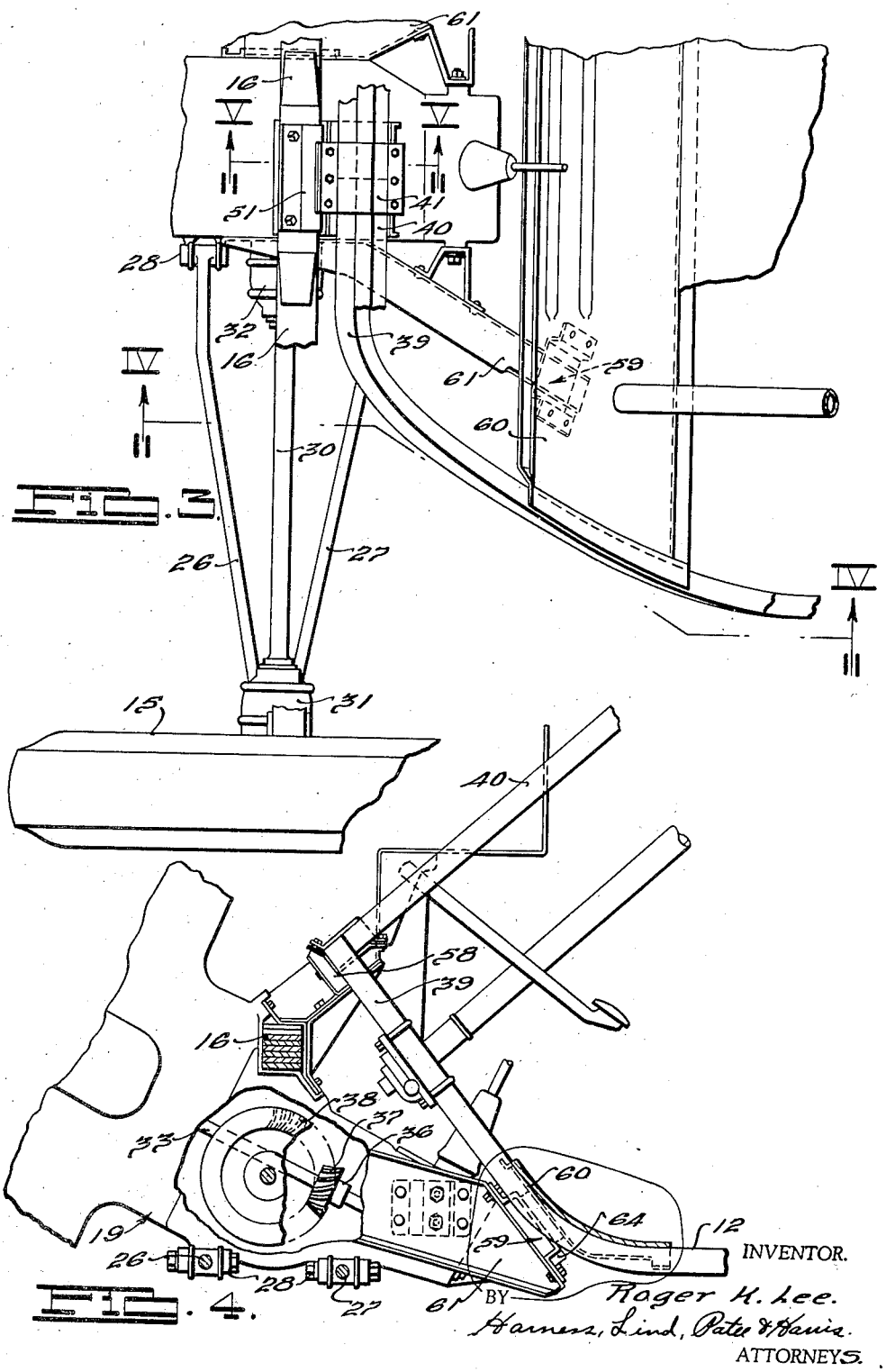

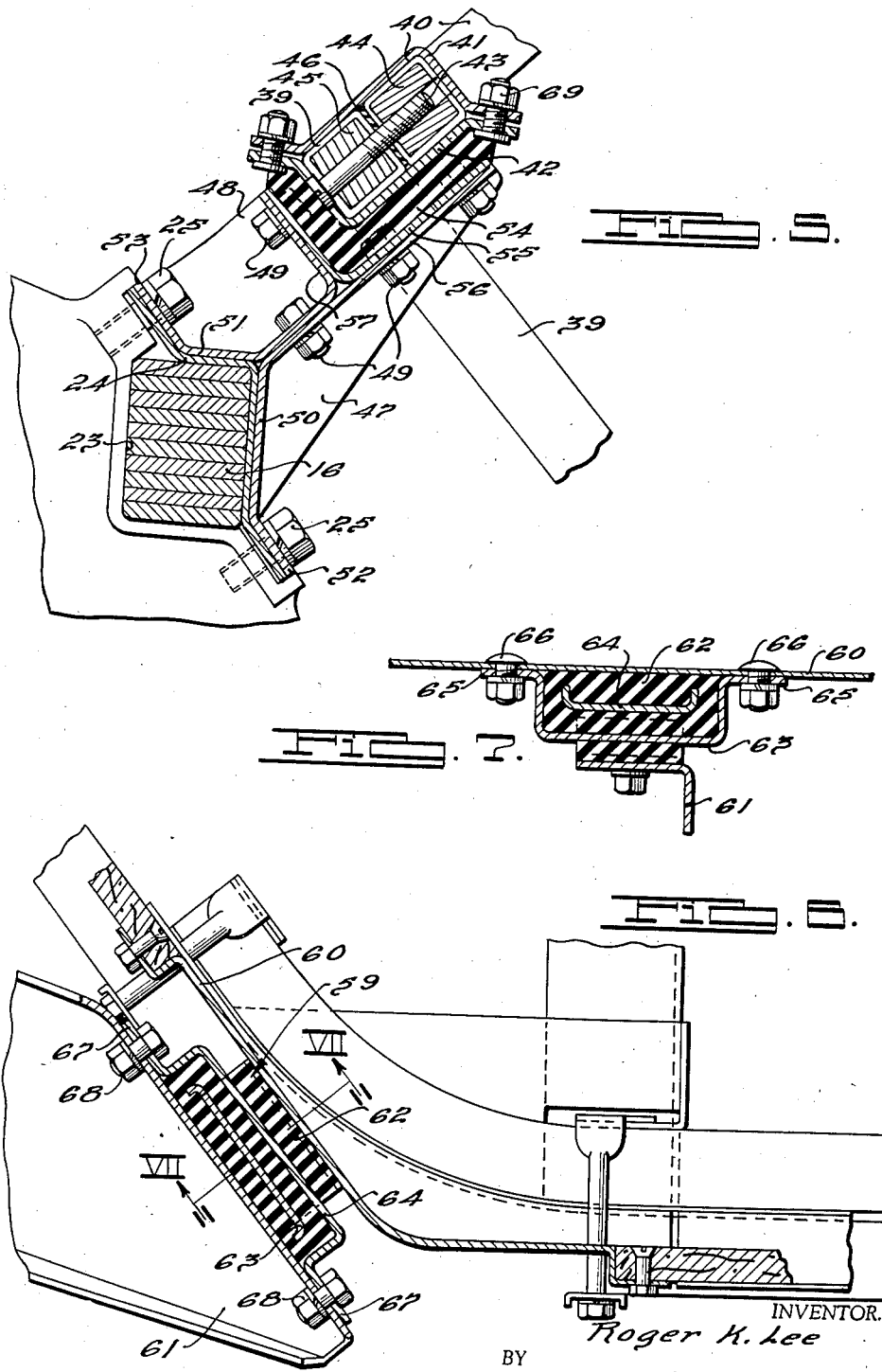

May 23, 1939.    R. K. LEE    2,159,332
MOTOR VEHICLE
Filed Dec. 4, 1936    5 Sheets-Sheet 4
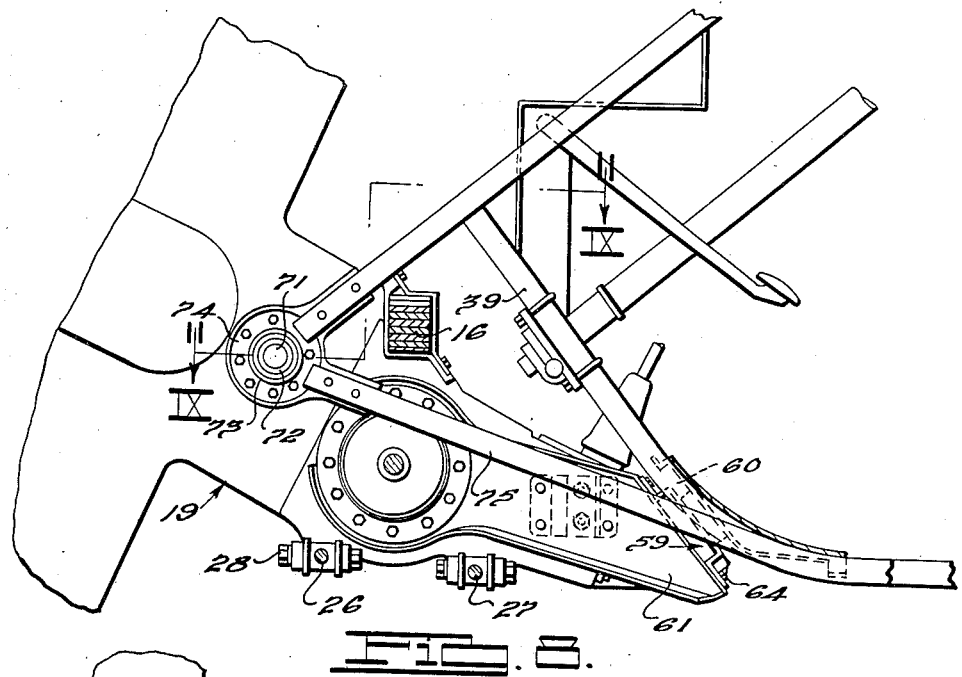
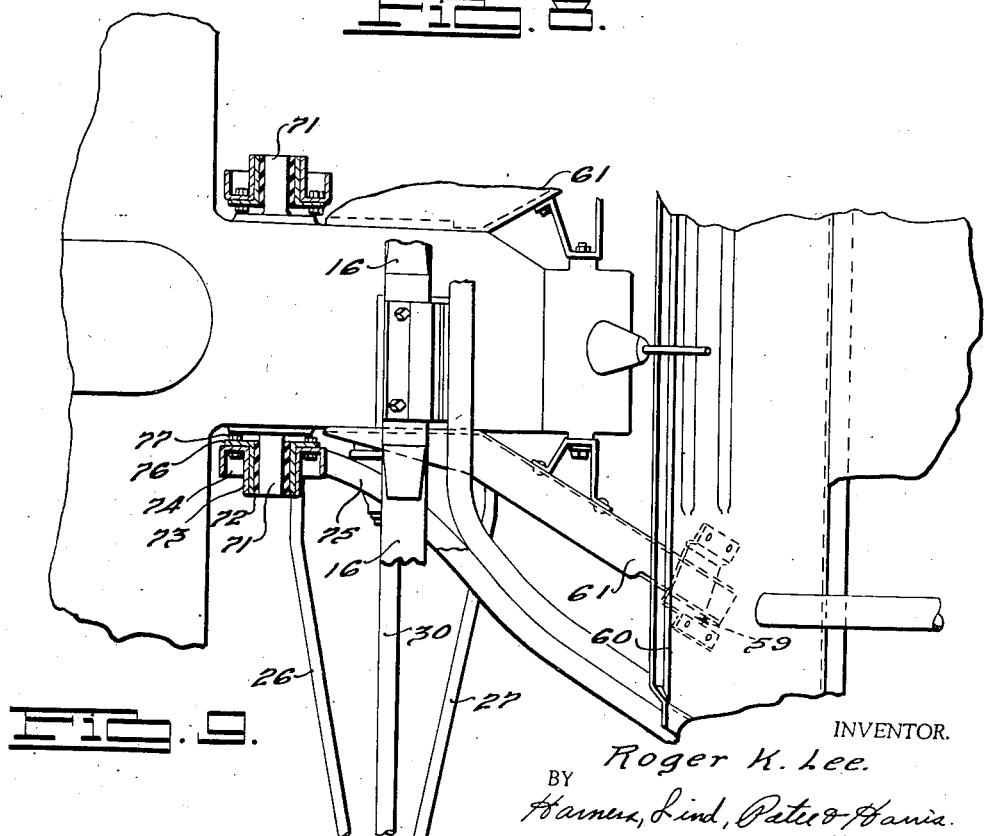
INVENTOR.
Roger K. Lee.
BY
Harness, Dind, Pates & Harris.
ATTORNEYS.

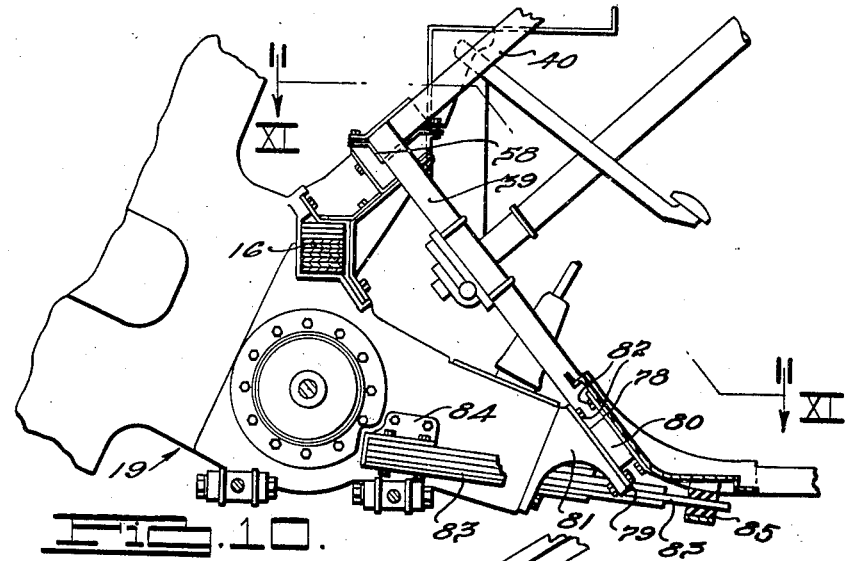
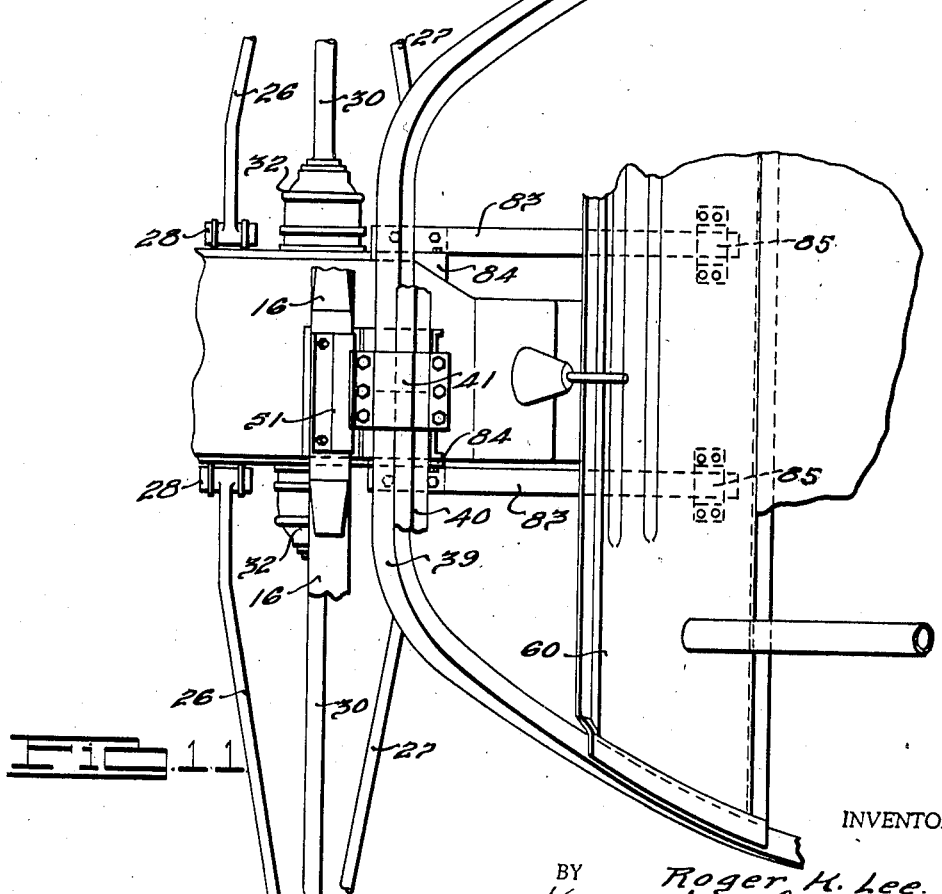

Patented May 23, 1939

2,159,332

UNITED STATES PATENT OFFICE 2,159,332

MOTOR VEHICLE

Roger K. Lee, Highland Park, Mich., assignor to Chrysler Corporation, Highland Park, Mich., a corporation of Delaware Application December 4, 1936, Serial No. 114,192

12 Claims. (Cl. 180—54)

This invention relates to improved vehicle construction.

More particularly, the invention pertains to improvements in vehicle engine unit and body mounting and association.

One of the main objects of the invention is to provide in a motor vehicle, for the absorption and dissipation of engine and traction torque reaction impulses and forces of external origination, mainly by controlled engine movements, so as to save the body portion of the vehicle, including its frame structure, from shock and vibration.

Other objects of the invention are to provide an engine unit mounting which so oscillatively supports the unit as to make available a large enough moment of inertia to effectively absorb both traction and engine torque reaction impulses; to provide an engine unit mounting of this character which supports the engine unit for oscillation about the same axis under the influence of the engine and traction torque reaction impulses, respectively; and to provide resiliently yielding mounting means which facilitates dissipation of the energy of such impulses by accommodating acceleration of movements of the power plant rather than movements of the body portions of the vehicle and which reduces the transmission of sound vibrations from the engine to the body.

Further objects of the invention are to provide a vehicle engine unit, body and wheel suspension assembly, in which the weight of the engine unit is supported substantially directly by the resilient means of the wheel assembly and the weight of the body is supported directly and yieldably on the resilient means in such a manner as to accommodate movement of the engine unit relative to the body.

Additional objects of the invention are to provide an assembly of the foregoing character in which resiliently yieldable body mounting means are disposed between the combined engine unit and wheel suspension, and the body structure for accommodating controlled energy absorbing oscillation of the engine unit relative to the body; to provide an assembly of this character in which the center of gravity of the engine unit is disposed on one side of and spaced a substantial distance from the oscillation axis of the unit and in which the application of the moment created by this unbalanced mass is applied on the body in a body weight supporting direction at a location spaced from an on the opposite side of the axis; and to provide a substantially statically balanced system of this character whereby the body is relieved of engine unit weight supporting functions and thus accordingly may be constructed of lighter and less rigid frame and other structural parts.

An important object of the invention is to provide means for yieldably holding the engine unit in static balance by the application of body weight supporting forces thereon and which yieldably oppose the external traction torque reactions by oppositely directed force applications on the body.

A further object of the invention is to provide a unitary wheel suspension and engine assembly which is detachable from the body portion of the vehicle and translatable to and from the body on the road wheels of the suspension.

An additional object of the invention is to provide a vehicle of this character in which the body carried weight is reduced by supporting the engine unit directly on the wheel suspension, thereby correspondingly reducing the tendency of the body to pitch as the vehicle changes its direction of travel.

A still further object of the invention is to provide a vehicle engine unit and body assembly of the foregoing character in which a large portion of the weight of one end of the body is applied on the engine unit at locations substantially laterally aligned with the center of gravity with the unit.

Other objects of the invention are to provide in a vehicle engine and body mounting of this character independent supporting members between the engine and a wheel assembly of the vehicle and independent pivotal and yielding supporting members between the engine unit and the body, the latter members being so aligned longitudinally of the vehicle as to allow the engine to be moved in response to road shock substantially without disturbing the body; and to provide resilient yieldable means, free from body weight supporting functions, for taking the traction torque reaction and for controlling the movement of the engine relative to the body and which can be predetermined in character to accomplish this function without interfering with the properties of any of the members that have for their main purpose the supporting of weight.

In conventional motor vehicles, it is, in general, the practice to derive driving torque from the rear end of a forwardly located engine unit about an axis extending in the general direction of the length of the vehicle. Inasmuch as this is the first application of engine torque on parts external of the power plant, the reaction resulting therefrom tends to urge the unit bodily about an axis extending generaly lengthwise of the vehicle. The thrusts of the driving road wheels upon the road surface results in a reaction which tends to urge the vehicle about an axis extending transversely of the vehicle. These two reaction factors applied on the vehicle body at different locations and in different directions cause vehicle body noise, shock and vibration and require otherwise unnecessary weight and structural reinforcement of the frame and structural parts of the body.

I have found that the energy of these reactions can be successfully dissipated, substantially without disturbing the body or subjecting it to excessive stresses, shock or vibrations, by so mounting the engine unit and constructing and arranging the road wheel driving mechanism that both the engine torque and traction torque reactions will tend to move the engine unit about the same axis. In order that the energy of these torque reactions can be effectively dissipated by engine unit movement, the unit is so oscillatively mounted that its moment of inertia about its oscillative axis is comparatively large and yielding connections are provided between the engine unit and body to accommodate such movement relative thereto. The moment of inertia of the engine unit is predetermined by locating the center of mass thereof in spaced relation to the oscillative axis and the mounting of the engine unit is such that the engine and traction torque reactions tend to lift its center of gavity.

The engine unit is held in a statically balanced condition by the body, a portion of the weight of which is applied on the engine unit through yieldable connecting means at a location on the opposite side of the axis from which the center of gravity of the unit is located. During movement of the engine unit about its axis under the influence of traction torque reaction, the weight of the body on these connecting means is unloaded and the connecting means are stressed in a direction substantially opposite that in which they are loaded by body weight.

Illustrative embodiments of the invention are shown in the accompanying drawings, in which:

Fig. 1 is a side elevational skeleton view, partly in section, showing a vehicle having a wheel suspension, engine unit and body mounting and assembly embodying the invention.

Fig. 2 is a front end elevational skeleton view of the structure shown in Fig. 1.

Fig. 3 is a fragmentary horizontal sectional view taken on the line III—III of Fig. 1.

Fig. 4 is a fragmentary longitudinal sectional view taken on the line IV—IV of Fig. 3.

Fig. 5 is a fragmentary enlarged longitudinal sectional view taken on the line V—V of Fig. 3.

Fig. 6 is an enlarged fragmentary sectional view of the structure circumscribed by a circle in Fig. 4.

Fig. 7 is a transverse sectional view taken on the line VII—VII of Fig. 6.

Fig. 8 is a vertical sectional view similar to Fig. 4 but showing a modified form of the invention.

Fig. 9 is a fragmentary sectional view taken on the line IX—IX of Fig. 8.

Fig. 10 is a fragmentary vertical view similar to Figs. 4 and 8, showing a still further form of the invention.

Fig. 11 is a fragmentary horizontal sectional view taken on the line XI—XI of Fig. 10.

In the form of the invention illustrated in Figs. 1 to 7, inclusive, the vehicle comprises a body portion generally designated by the numeral 11 which is constructed of a tubular frame structure 12 that serve as the chassis frame and body frame of the vehicle. The frame structure 12 is enclosed within a sheet metal skin generally designated by the numeral 13. The body portion of the vehicle is supported on front and rear pairs of road wheels 14 and 15. The front wheels 15 are pivotally connected together by a transversely disposed leaf spring 16 having eyes at its opposite end portions pivotally secured at 17 to wheel mounting structures 18, as illustrated in Fig. 2, the spring 16 being disposed above the elevation of the axes of the wheels.

Mounted on the intermediate portion of the spring 16 is an internal combustion engine unit generally designated by the numeral 19, which includes a radial type of internal combustion engine generally designated by the numeral 20, a clutch generally designated by the numeral 21, and a transmission mechanism generally designated by the numeral 22.

The internal combustion engine, clutch and transmission are assembled together in a unitary structure, hereinafter called the engine unit of the vehicle. The mounting of the engine unit 19 on the leaf spring 16 is clearly illustrated in Fig. 5. The casing of the clutch mechanism 21 is provided with an angular recess 23 for receiving the intermediate portion of the leaf spring 16 on which the engine is securely clamped by an angular shaped bracket 24 secured to the engine unit by bolts 25.

The front wheels 15 are stabilized by front and rear pairs of radius rods 26 and 27, shown in Fig. 3, which have inner ends pivotally attached at 28 to the engine unit and outer ends connected at 29 to the wheel mountings 18 by universal joints. Propeller shafts 30 extending transversely of the vehicle drivingly connect the front wheels with the engine unit. Each propeller shaft 30 is connected to its respective front wheel 15 by a universal joint 31 and its inner end is connected to the engine unit by a universal joint 32. The driving torque is derived from the transmission of the engine unit in the manner illustrated in applicant's co-pending application, Serial No. 63,698, now Patent No. 2,105,742, and as diagrammatically shown in Fig. 4. The crankshaft (not shown) is drivingly connected by the clutch mechanism 21 with a transmission shaft 33 by which the initial driving gearing of the transmission (not shown) is operated. Journaled on the shaft 33 is a tubular shaft 36 which is operatively connected with the torque output gearing of the transmission. The tubular shaft 36 carries a beveled pinion 37 which meshes with and drives a beveled gear 38 from which the propeller shafts 30 are in turn driven. By virtue of this construction and arrangement of the vehicle driving mechanism, both the engine torque reaction impulses and the traction torque reaction impulses resulting from the rearward push of the road wheels 15 upon the road during forward driving of the vehicle, tend to oscillate the engine unit relative to the body portion of the vehicle in a clockwise direction as viewed in Fig. 4.

The front end of the body portion 11 is so mounted on the front wheel suspension as to comparatively freely accommodate oscillatory movement of the engine relative to the body structure. The mounting of the front end of the body is best illustrated in Figs. 4 and 5. The frame structure 12 of the front end portion of the vehicle body comprises forwardly converging and upwardly inclined lower tubular sections 39 and forwardly converging downwardly inclined upper tubular sections 40 which abut at the longitudinal central vertical plane of the vehicle body and which are firmly clamped together by complementary angular brackets 41 and 42. The tubular sections 39 and 40 are also secured together at this location by bolts 43 which are preferably threaded in blocks 44 and 45 provided in the interior of the tubular sections 39 and 40, respectively. If desired, a thin sheet of rubber 46 may be provided between the adjacent side surfaces of the frame sections 39 and 40 and this rubber may be cemented or otherwise rigidly bonded to these adjacent metal surfaces.

The front end portion of the body is yieldably and pivotally connected with the transverse spring 16 of the front wheel suspension by brackets 47 and 48 which are clamped together by bolts 49 and provided with webs 50 and 51, respectively, that form an angular socket which is seated upon the angular bracket 24 of the engine attaching means. The webs 50 and 51 are provided with ears 52 and 53 having apertures for receiving the bolts 25, whereby the latter bolts are employed to secure the engine unit and the body mounting member to the leaf spring 16.

A layer of yieldable material, preferably rubber 54, is rigidly bonded, preferably by vulcanization, to the angular clamping member 42, and an angular attaching plate 55 is rigidly bonded, preferably by vulcanization, to the yieldable member 54, as illustrated in Fig. 5. The attaching plate 55 is received in an angular recess provided by angularly disposed webs 56 and 57 of the brackets 47 and 48, respectively, and detachably secured thereto by the bolts 49. The clamping member 42 and correspondingly angularly shaped attaching plate 55, together with the interposed layer of rubber, are preferably formed as a unit to facilitate convenient bonding of the rubber to the metal plates during vulcanization of the rubber. This yieldable member is predetermined in yielding properties to accommodate oscillatory movement of the engine unit under the influence of the traction and engine torque reaction impulses about an axis extending transversely of the vehicle and located substantially at the point designated by the numeral 58 in Fig. 4.

The engine unit and front wheel suspension are stabilized with respect to this axis by yieldable members, generally designated by the numeral 59, which form movement accommodating connections between the body portion of the vehicle and the engine unit. These yieldable connecting members are interposed between a metal plate 60 of the body frame structure and rearwardly extending arms 61 which are rigidly attached to the engine unit 19 and disposed on opposite lateral sides thereof. Each yieldable connecting unit comprises a body of rubber 62 through which the web portions of oppositely arranged and interlocked channel shaped brackets 63 and 64 extend. The open side of the channel shaped bracket 63 is disposed rearwardly and provided along its side walls with outwardly extending flanges 65 which are rigidly secured by bolts 66 to the body frame plate 60. The channel shaped bracket 64 has its open side disposed forwardly and its side walls are provided with outwardly extending flanges 67 which are rigidly attached to the rearwardly extending arms 61 of the engine unit by bolts 68. A portion of the body of rubber 62 is disposed between parallel web parts of the brackets 63 and 64 and other portions of the rubber body 62 are disposed between the web portion of the bracket 64 and the plate 60, and the web portion of the bracket 63 and the engine unit arm 61, respectively. That portion of the rubber 62 between the plate 60 and the bracket 64 and the portion of the rubber between the bracket 63 and the arm 61 are preferably formed of sufficient thickness to cause the rubber body to be placed under an initial compression as the bolts 66 and 68 are tightened. The rubber between the web portions of the two brackets may also be of sufficient thickness to be subjected to compression when the brackets are pulled into their assembled relationship between the engine arm 61 and the body structure. All contacting surfaces of the brackets 63 and 64 and the rubber body portion 59 are bonded together, preferably by vulcanization.

The front wheel suspension and engine unit are, by virtue of the above construction, associated as an independent and completely unitary assembly which may be conveniently disconnected from the body portion of the vehicle and translated to and from the latter on the front road wheels 15. This may be accomplished by removing either the bolts 66 or 68 of the movement accommodating members 59 and the bolts 69 by which the clamping brackets 41 and 42 are secured together. When these detachments have been effected and all of the controls which tie between the body and the engine unit have been disconnected, the entire engine unit and front wheel suspension may be separated from the body by lifting the front end of the latter and wheeling the engine unit and wheel suspension away therefrom on the road wheels.

In operation of a vehicle embodying my invention, the entire weight of the engine unit is supported directly by the front wheel suspension. Where, as in the form of the invention illustrated in Figs. 1 to 7, inclusive, the body of the vehicle is yieldably and pivotally mounted on the wheel suspension at a location substantially spaced from the center of gravity of the engine unit, which is diagrammatically illustrated as located at the point designated by the numeral 70, the engine unit normally tends to rotate in a counter-clockwise direction about the axis 58. The yieldable connecting members 59, however, serve to maintain the engine unit in static balance of equilibrium and in accomplishing this function, there is applied on the body structure of the vehicle a force having an upwardly directed component. During driving of the vehicle forwardly by the front road wheels, the traction torque reaction tends to turn the body about the axis 58 in a clockwise direction. The connecting members 59 also serve to oppose this dynamic force but inasmuch as they are loaded in an opposite direction by the unbalanced mass of the engine unit, neither the connecting units nor the frame structure of the vehicle is called upon to directly oppose this torque reaction until the opposite effect of the unbalanced mass of the engine has been exceeded. The freedom of the engine unit to move relative to the body in response to traction torque reaction impulses saves the body from being subjected to severe shock and vibration, the energy of the traction torque reaction impulses being absorbed or dissipated by movement of the engine about the axis 58 with respect to which the moment of energy of the engine is brought to a large enough value to mainly accomplish this purpose by reason of the spaced location of the center of gravity of the engine from this axis. By supporting the weight of the engine substantially directly on the wheel suspension and relieving the frame structure of the body from the task of directly and rigidly opposing the traction torque reaction impulses, less rigidity is required at the front end portion of the body structure, and thus the parts thereof may be of lighter and of less expensive construction. The rubber 54 of the pivotal body mounting member and the rubber 62 of the movement accommodating connection members prevents metal-to-metal contact of the front wheel traction unit and the body portion of the vehicle, thereby serving to interrupt the direct transmission of further vibrations from the engine unit and associated structure with the body portion. These rubber elements are deflected during oscillatory movement of the engine unit and they therefore assist in the absorption or dissipation of the forces normally tending to subject the body to shock and vibration.

By virtue of the construction and arrangement of the mechanism, namely propeller shafts 30, through which the final torque is applied on the driving road wheels, the direction of application of both engine and traction torque reactions is so predetermined as to facilitate convenient dissipation of the energy of these reactions by controlled movement of the engine unit about a single axis. In this manner, the application of conflicting and differently directed shock and vibration creating forces upon the vehicle is effectively guarded against.

In the form of the invention illustrated in Fig. 9, the mounting of the engine unit on the transverse leaf spring 16 of the wheel suspension and the movement accommodating connections between the frame structure of the body and the arm 61 of the engine unit are substantially identical to the corresponding members of the form of the invention shown in Figs. 1 to 7, inclusive, and the respective parts thereof are designated by the same numerals. In this form of the invention, however, the weight of the front end of the body portion of the vehicle is applied directly on the engine unit at points laterally aligned with the center of gravity of the engine unit. The connection between the front end portion of the body structure and the unit is provided by spaced trunnions 71 which extend outwardly from the sides of the engine unit and which are aligned with the center of mass thereof. Each trunnion 71 is received in a rubber bushing 72 which is held in a tubular fixture 73. The tubular fixtures 73 are received in apertured brackets 74 carried by forwardly extending arms 75 of the frame structure of the body and they are provided with radial flanges 76 which are detachably secured to the apertured brackets 74 by bolts 77.

In the form of the invention shown in Figs. 10 and 11, a part of the weight of the front end portion of the body is supported by the transverse leaf spring 16 by mounting means substantially identical to the corresponding mounting members of the form of the invention in Figs. 1 to 7, inclusive. The parts of this structure are likewise correspondingly designated by the same numerals. Another portion of the weight of the front end part of the body is supported by a mounting member disposed rearwardly of the transmission of the engine unit and located substantially in the vertical central longitudinal plane of the body. Thus the two mounting members are aligned longitudinally of the vehicle and disposed centrally thereof. The rear mounting member comprises a pair of plates 78 and 79, between which a pad of rubber 80 is disposed. The rubber pad 80 is preferably bonded by vulcanization to the adjacent sides of the plates 78 and 79. One of the latter plates is secured to the frame structure of the body and the other is secured to a bracket 81 mounted on the engine unit, by bolts 82. If desired, the same type of movement accommodating connecting members may be employed at the rear end of the engine unit shown in Fig. 10 as those provided between the rearwardly extending arms 61 and the body frame structure illustrated in the form of the invention shown in Figs. 1 to 7, inclusive. This two-point body mounting accommodates pivotal movement of the engine in response to traction and engine torque reaction impulses about an axis located in the same position as that shown in Fig. 4 and designated by the same numeral 58, and at the same time accommodates movement of the engine unit about an axis corresponding to a line joining the two mounting members under the influence of road shock. In this manner, movement of the engine occurs in response to irregularities encountered by the road wheels and the energy of such impulses is dissipated by engine movement rather than by body movement, thereby protecting the vehicle body from shock and vibration.

In order to stabilize the engine unit and yieldably and resiliently oppose movements of this latter character, there is provided on each side of the rear end portion thereof a leaf spring 83 which is secured to one side of the engine unit by a bracket 84. The rear end portions of the leaf springs 83 are yieldably attached to the body portion of the vehicle by rubber blocks 85 mounted on the body and having slots therein in which the rear end portions of the springs are received. In this form of the invention, movement of the engine unit may be relied upon to dissipate the energy of both traction and engine torque reaction impulses and to prevent the direct application of road shock on the body.

Although but several specific forms of the invention are herein shown and described, various changes in the details of the construction may be made without departing from the spirit of the invention.

What I claim is:

1. A vehicle including a wheel suspension, a vehicle body adjacent thereto, an engine unit mounted on said wheel suspension, yieldable means interposed between and connecting said body and wheel suspension, said yieldable means being so constructed and arranged as to accommodate oscillatory movement of said engine unit about an axis spaced from the center of gravity thereof, and yieldable engine unit stabilizing means coacting between said engine unit and body at a location on the opposite side of said axis from that on which said center of gravity is disposed.

2. A vehicle including a wheel suspension comprising spaced road wheels and an interconnecting resilient member, a vehicle body adjacent said wheel suspension, an engine unit mounted directly on said resilient member, yieldable means interposed between and connecting said body and wheel suspension, said yieldable means being so constructed and arranged as to accommodate oscillatory movement of said engine unit about an axis spaced from the center of gravity thereof, and yieldable engine unit stabilizing means coacting between said engine unit and body at a location on the opposite side of said axis from that on which said center of gravity is disposed.

3. A vehicle including a wheel suspension, a vehicle body adjacent thereto, an engine unit mounted on said wheel suspension, means comprising rubber interposed between and yieldably connecting said body and wheel suspension, said rubber connecting means being so constructed and arranged as to accommodate oscillatory movement of said engine unit relative to said body about an axis spaced from the center of gravity of said unit and extending transversely of said vehicle, and yieldable engine unit stabilizing means comprising rubber coating between said engine unit and body at a location on the opposite side of said axis from that on which said center of gravity is located.

4. A vehicle including a front wheel suspension having a driving road wheel on each side thereof, a vehicle body adjacent said wheel suspension, an engine unit mounted on said wheel suspension, means yieldably connecting said wheel suspension and body adapted to accommodate oscillation of said engine unit about an axis extending laterally of said vehicle, the center of gravity of said engine unit being in advance of said axis, and yieldable means between and fixed to portions of said engine unit and body respectively located rearwardly of said axis for holding said engine unit in static balance.

5. A vehicle including a front wheel suspension having a driving road wheel on each side thereof, a vehicle body adjacent said wheel suspension, an engine unit mounted on said wheel suspension, means yieldably connecting said wheel suspension and body adapted to accommodate oscillation of said engine unit about an axis extending laterally of said vehicle, the center of gravity of said engine unit being in advance of said axis, and means for holding said engine unit in static balance including a rubber connecting member disposed between and fixed to said engine unit and body respectively and located rearwardly of said axis, portions of the rubber of said connecting element being stressed in tension in yieldably opposing oscillation of said engine unit under the influence of traction torque reaction.

6. A vehicle including a wheel suspension having driving road wheels on opposite sides thereof, a vehicle body, an engine mounted on said wheel suspension having its weight supported substantially independently thereby, and resilient means between and connecting said wheel suspension and body and adapted to accommodate oscillation of said engine unit relative to said body about an axis extending transversely of said vehicle under the influence of traction torque reaction impulses, the center of gravity of said engine unit being located in such spaced relation to said axis as to cause the moment of inertia of said unit to oppose movement thereof about said axis by the traction torque reaction impulses during operation of said driving road wheels.

7. A vehicle including a wheel suspension having driving road wheels on opposite sides thereof, a vehicle body, an engine mounted on said wheel suspension having its weight supported substantially independently thereby, resilient means between and connecting said wheel suspension and body and adapted to accommodate oscillation of said engine unit relative to said body about an axis extending transversely of said vehicle under the influence of traction torque reaction impulses, the center of gravity of said engine unit being located in such spaced relation to said axis as to cause the moment of inertia of said unit to oppose movement thereof about said axis by the traction torque reaction impulses during operation of said driving road wheels, and yieldable means between said engine unit and body for maintaining said engine unit in static balance.

8. A vehicle including a wheel suspension having driving road wheels on opposite sides thereof, a vehicle body, an engine mounted on said wheel suspension having its weight supported substantially independently thereby, resilient means between and connecting said wheel suspension and body and adapted to accommodate oscillation of said engine unit relative to said body about an axis extending transversely of said vehicle under the influence of traction torque reaction impulses, the center of gravity of said engine unit being located in such spaced relation to said axis as to cause the moment of inertia of said unit to oppose oscillation thereof by the traction torque reaction impulses during operation of said driving road wheels, and rubber connecting members having portions normally acting in compression between said body and engine unit for holding the latter in static balance and in tension to oppose oscillation of said engine unit by said traction torque reaction impulses during driving operation of said road wheels.

9. In a vehicle including a body portion, a unitary engine unit and wheel suspension assembly including a pair of spaced road wheels, means for interconnecting said wheels comprising a transverse resilient member, an engine unit having a portion disposed below and attached to said resilient member, and means above said resilient member for detachably securing said body portion thereto.

10. In a vehicle including a body portion, a unitary engine unit and wheel suspension assembly including a pair of spaced road wheels, means for interconnecting said wheels comprising a transverse resilient member, an engine unit having a portion disposed below and attached to a central part of said resilient member, and means for detachably securing said body portion to said resilient member including yielding members disposed above and attached to said central part of said resilient member and adapted to accommodate limited movement of said assembly relative to said body portion.

11. A vehicle including a wheel suspension comprising a pair of driving road wheels and an interconnecting resilient member extending transversely of said vehicle and between said wheels, an engine unit extending below and suspended from an intermediate part of said resilient member, a vehicle body pivotally mounted on said resilient member at a location above said intermediate part thereof, and means including resilient material bearing between said engine unit and body for stabilizing said wheel suspension and engine unit.

12. A vehicle including a wheel suspension, an engine unit mounted on and having substantially its entire weight sustained by said wheel suspension, a vehicle body adjacent said wheel suspension, means including yieldable material located substantially in lateral alignment with the center of gravity of said engine unit for oscillatively connecting said body thereto, and means free from the weight of said body and engine unit for yieldably opposing oscillation of the latter relative to said body.

ROGER K. LEE.